UNITED STATES PATENT OFFICE.

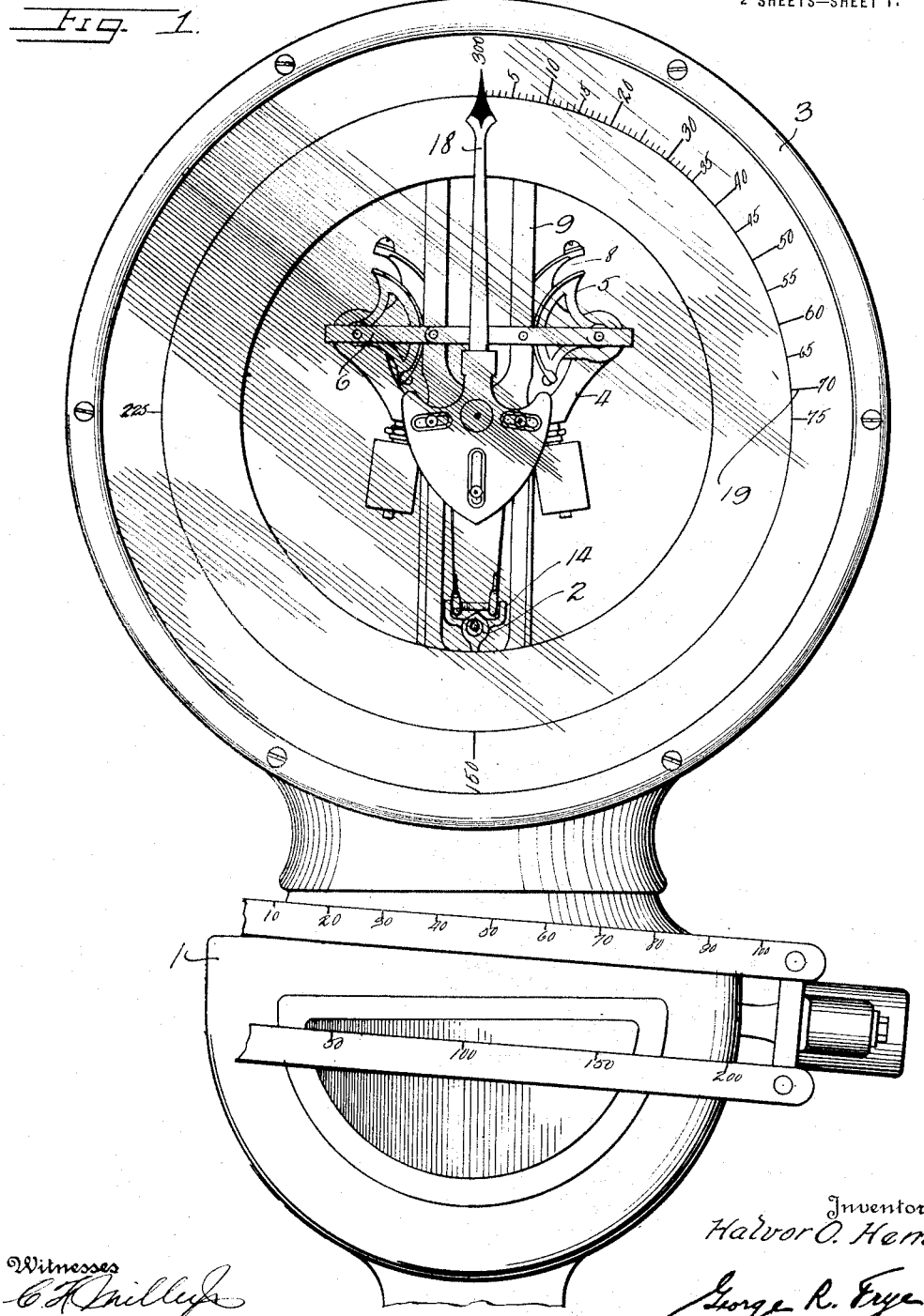

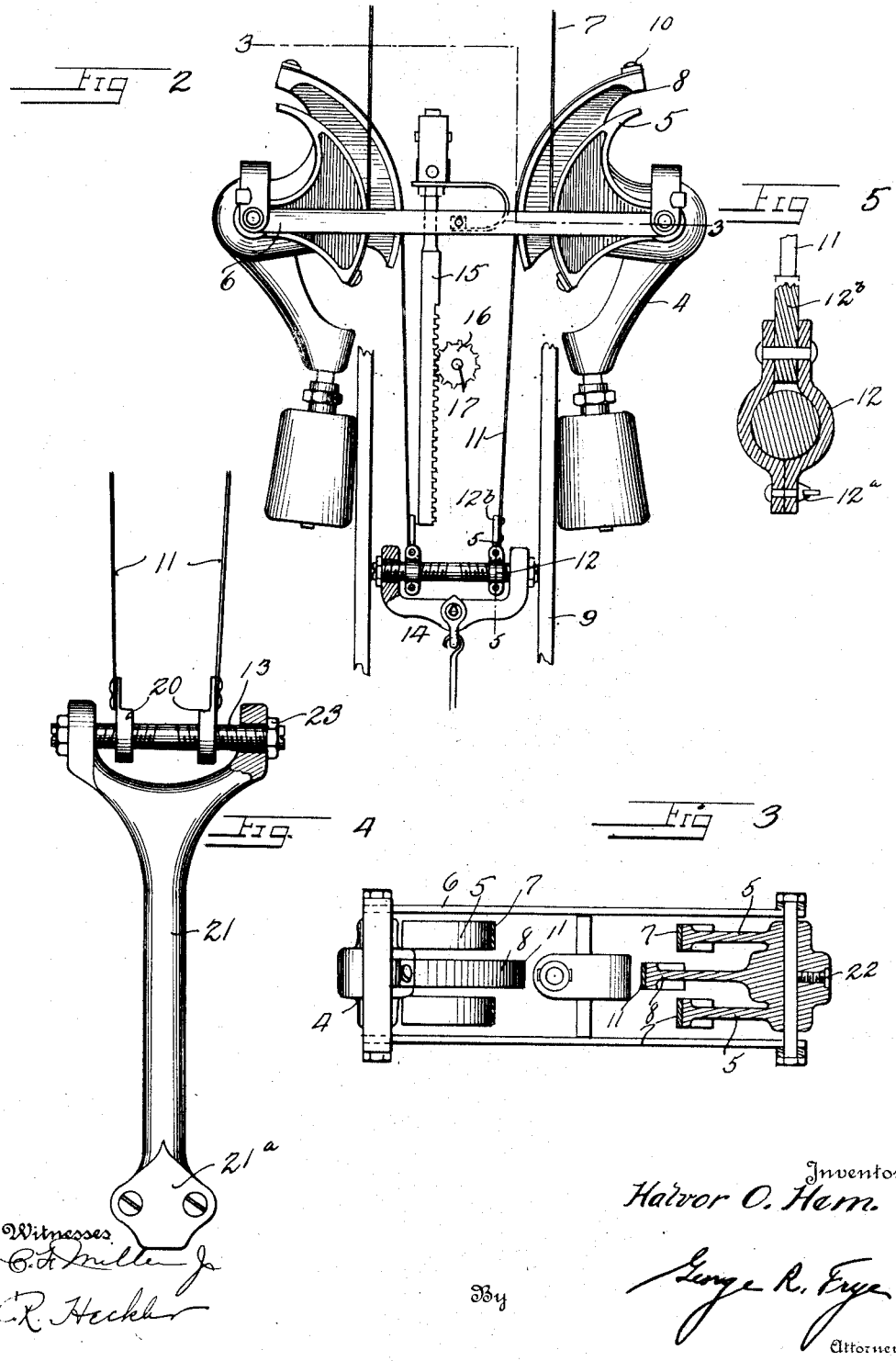

HALVOR O. HEM, OF TOLEDO, OHIO, ASSIGNOR TO TOLEDO SCALE COMPANY, OF TOLEDO, OHIO, A CORPORATION OF NEW JERSEY.

PENDULUM WEIGHING MECHANISM.

1,369,103.  Specification of Letters Patent.  Patented Feb. 22, 1921.

Application filed April 2, 1917. Serial No. 159,170.

*To all whom it may concern:*

Be it known that I, HALVOR O. HEM, a citizen of the United States, residing at Toledo, in the county of Lucas and State of Ohio, have invented certain new and useful Improvements in Pendulum Weighing Mechanisms, of which the following is a specification.

This invention relates to pendulum weighing scales and more particularly to the pendulum mechanisms thereof.

In scales of this character it has been the custom to utilize pendulums comprising a weighted stem and a hub with which are associated cams or eccentric segments adjustably secured upon the hub, connection being made from the pendulum to the scale levers through flexible ribbons passing over the face of the segments.

To effect adjustments of these pendulums to vary their effect during the weighing operation, the pendulums are swung relatively to the weighted stem, and, as each pendulum must be separately adjusted, difficulty is encountered in securing equal and uniform adjustments in opposed pendulums, while the constant pull on the adjusting screws tends to loosen them and allow the pendulums to fall. To improve pendulum mechanisms of this character is the primary object of my invention. Thus, the present invention provides means for simultaneously and equally adjusting the positions of opposed pendulums while doing away with the necessity of using adjusting screws for connecting the segments and pendulum hubs; it enables the use of an integral pendulum center including both the segments and hubs; and it provides a simple and conveniently placed means for effecting the simultaneous adjustments of the pendulums.

Other objects and advantages will readily appear from the following description and the accompanying drawings, wherein preferred embodiments of my invention are illustrated and wherein similar reference numerals designate similar parts throughout the several views.

In the drawings:—

Figure 1 is a front elevation of the upper mechanism of my improved scale, parts being broken away; Fig. 2 is an enlarged detail view of the pendulum mechanism thereof, with parts in section; Fig. 3 is a plan and sectional view taken substantially on the line 3—3 of Fig. 2; Fig. 4 is an enlarged detail view of another form of the oppositely threaded adjusting bolt; and Fig. 5 is a detail vertical section taken substantially on the line 5—5 of Fig. 2.

In the drawings I have illustrated the upper portion of a scale employing two oppositely-disposed pendulums substantially as shown in the patent to Hapgood, No. 1,203,611, issued November 7, 1916, and my improved invention is particularly adapted for use with such pendulum mechanisms. It is to be understood, however, that other types of pendulum scales may also be employed in connection with the present invention and also that it is immaterial whether such pendulum mechanisms are employed in hanging, portable or dormant scales. I have herein illustrated the upper portion of a column 1 which is adapted to rest upon the deck of a platform scale of the usual type, it being understood that the platform-supporting and other scale levers are connected so as to transmit a pull to a steelyard extending upwardly within the column and connected at its upper extremity, as at 2, to the pendulum mechanism, which is preferably inclosed within a casing 3 supported upon the column 1.

The pendulum mechanism comprises a pair of oppositely-disposed pendulums 4, each of which includes supporting or fulcrum segments 5 secured on transverse shafts, and the two shafts are connected by crossbars 6, the segments 5 being suspended at the lower ends of flexible supporting ribbons 7 secured at their upper ends upon the framework of the scale. Intermediate the supporting segments of each pendulum is a somewhat larger segment 8 which is also fixed to the transverse shaft, said segment extending at its periphery between the pillars 9 of the framework supporting the segments 5, and being connected at its upper end, as at 10, to a flexible metallic ribbon 11 which extends over the arcuate face of the segment and is attached at its lower end to a collar 12 which is internally threaded and mounted upon the adjusting bolt 13. The construction of the two pendulums is substantially identical and the collars 12 connected with the ribbons 11 are threaded upon the opposite ends of the adjusting bolt 13, the adjusting bolt being suitably threaded to permit the travel of the collars 12 toward and from its center as the bolt is rotated. The bolt 13 is journaled within the arms of a U-shaped equalizer bar 14, to the central portion of which is connected the upper extremity of a steelyard 2 through which connection is made with the platform-supporting and other scale levers.

In the operation of the scale, when a load is placed upon the scale platform, a downward pull is exerted upon the steelyard rod and the equalizer bar 14, which is transmitted through the ribbons 11 to the larger segments 8, causing the swinging of the pendulums so that the pendulum weights are raised to a counterbalanced position. During the swinging movement of the pendulums to offset the weight of the load being weighed, the crossbars 6 are moved vertically upward, and through the medium of this vertical movement of the crossbars the weight indication on the dial is effected, the crossbars carrying a vertically-disposed rack 15 meshing with a pinion 16 fixed upon the indicator shaft 17 carrying the index hand 18. The indicator shaft 17 is mounted concentrically of the dial 19 having the desired weight graduations suitably inscribed thereon, as, for example, in the manner shown in Fig. 1, with which graduations the index hand 18 coöperates in indicating the weight of the load. When the load is removed from the platform of the scale the pendulums fall to their original positions, returning the crossbars 6 and indicating mechanism so that the index hand 18 again points to the zero indication on the dial.

When it is desired to adjust the pendulums so as to vary their effect during the weighing operation, the adjusting bolt 13 is rotated, whereby the collars 12 are simultaneously and equally moved toward or from the center of the bolt according to the direction of the bolt's rotation. The movement of the collars 12 serves to move the lower extremities of the ribbons 11, so that the lowest point of contact with the face of the larger segments 8 will be changed, thereby changing the position of initial pull of the ribbons upon the pendulum mechanism. The larger segments 8 being eccentrically placed with relation to the axis of the pendulum, this change of the position of the ribbon at the point of initial pull will effect the same adjustment that was formerly made by changing the position of the eccentric segment with relation to the pendulum hub in constructions such as shown in the Hapgood patent hereinbefore mentioned. The collars 12, as shown in Figs. 2 and 5, are each preferably formed in two parts connected together at their lower extremities by a set screw 12ª and arranged at their upper extremities to receive a plate 12ᵇ to which is secured the lower extremity of the ribbon 11. Such construction affords ready means for securing the ribbons to the collars while reinforcing the lower extremities of the ribbons, and also affords means for the ready assembly of the collars 12 upon the adjusting bolt.

In Fig. 4 is shown a somewhat modified construction of the collars wherein integral collars 20 are threaded upon the adjusting bolt 13 and each provided with an upwardly-extending lip or flange for connection with the lower extremities of the ribbons 11. The equalizer bar 21 in which the adjusting bolt is mounted is also provided with an elongated shank and at its lower extremity is flattened as at 21ª to provide a surface for connecting a rod or link with the steelyard. In either construction means may be provided for locking the adjusting bolt 13 in any desired position, as, for example, the lock nuts 23.

It is to be noted that in Fig. 3 I have shown the fulcrum segments 5 and the larger eccentric segment 8 as integrally formed with the pendulum center, which is fixed upon the transverse shaft as by a set screw 22. It is to be understood that in addition to this construction the larger segment 8 may be formed separately from the fulcrum segments 5 and each separately fixed upon the transverse shaft.

While it will be apparent that the illustrated embodiments of my invention herein shown are well calculated to adequately fulfil the objects and advantages primarily set forth, it is to be understood that my invention is susceptible to variation, modification and change without departing from the spirit and scope of the invention as set forth in the subjoined claims.

Having described my invention, I claim:

1. In a weighing scale, pendulum weighing mechanism comprising a pendulum having an eccentric segment connected therewith, a flexible member fixed to said segment and passing over the face thereof, adjusting means for moving the flexible member to change the point of contact of the flexible member with the segment when the pendulum is in zero position, and means for connecting the flexible member and adjusting means with a commodity-receiver.

2. In a weighing scale, pendulum weighing mechanism comprising a pendulum having an eccentric segment connected therewith, a flexible member fixed to said segment and passing over the face thereof, adjusting means for moving the flexible member to change the lowest point of contact of the flexible member with the segment, including a movable collar to which the flexible member is connected and means for moving said collar, and means for connecting the flexible member and adjusting means with a commodity-receiver.

3. In a weighing scale, pendulum weighing mechanism comprising a pendulum having an eccentric segment connected therewith, a flexible member fixed to said segment and passing over the face thereof, adjusting means for moving the flexible member to change the lowest point of contact of the flexible member with the segment, including a threaded collar to which the flexible member is connected and a rotatable bolt upon which the collar is mounted, and means for connecting the flexible member and adjusting means with a commodity-receiver.

4. In a weighing scale, a pair of oppositely-disposed pendulums having eccentric segments extending toward each other, flexible members fixed to said segments and extending over the faces thereof, adjusting means for moving the flexible members to change the lowest point of contact of the flexible members with the segments, and means for connecting said adjusting means with the commodity-receptacle.

5. In a weighing scale, a pair of oppositely-disposed pendulums having eccentric segments extending toward each other, flexible members fixed to said segments and extending over the faces thereof, adjusting means for simultaneously and equally moving the lower extremities of the flexible members toward or away from the segments so as to change the lowest point of contact of the flexible members with the segments, and means for connecting said adjusting means with the commodity receptacle.

6. In a weighing scale, a pair of oppositely-disposed pendulums having eccentric segments extending toward each other, flexible members fixed to said segments and extending over the faces thereof, adjusting means for simultaneously and equally moving the lower extremities of the flexible members toward or away from the segments so as to change the lowest point of contact of the flexible members with the segments, said means including a pair of threaded collars to which the lower extremities of the flexible members are connected and an oppositely-threaded bolt upon which said collars are mounted, and means for connecting said adjusting means with the commodity receptacle.

7. In a weighing scale, a pair of oppositely-disposed pendulums having eccentric segments extending toward each other, flexible members fixed to said segments and extending over the faces thereof, means for simultaneously and equally moving the lower extremities of the flexible members toward or away from the segments so as to change the lowest point of contact of the flexible members with the segments, said means including a pair of threaded collars to which the lower extremities of the flexible members are connected and an oppositely-threaded bolt upon which said collars are mounted, and means for connecting said bolt with the commodity receptacle.

8. In pendulum weighing mechanism, a pendulum center comprising integrally-formed fulcrum segments and a larger power segment, suspending means secured to the fulcrum segments, a flexible member secured to and passing over the face of the power segment, and means for varying the length of the portion of the flexible member in engagement with the power segment to vary the lowest point of contact of the flexible member with the segment.

9. In pendulum weighing mechanism, a pendulum center comprising integrally-formed fulcrum segments and a power segment of different diameter, suspending means secured to the fulcrum segments, a flexible member secured to and passing over the face of the power segment, and means for varying the length of the portion of the flexible member in engagement with the power segment to vary the lowest point of contact of the flexible member with the segment.

10. In pendulum weighing mechanism, a pendulum center comprising integrally-formed fulcrum segments and a power segment of different diameter arranged with its arcuate face on an axis eccentric with the axis of the pendulum center, suspending means secured to the fulcrum segments, a flexible member secured to and passing over the face of the power segment, and means for varying the length of the portion of the flexible member in engagement with the power segment to vary the lowest point of contact of the flexible member with the segment.

11. In weighing scales, a pair of oppositely-disposed pendulums, a segment connected with each pendulum and extending toward each other, flexible ribbons fixed at their upper extremities to the segments and passing over the faces thereof, members connected with the lower extremities of the ribbons, adjusting means for moving said members toward or from each other to change the lowest points of contact of the ribbons with the segments, and means for connecting said adjusting means with the commodity receptacle.

12. In weighing scales, a pair of oppositely-disposed pendulums, a segment connected with each pendulum and extending toward each other, flexible ribbons fixed at their upper extremities to the segments and passing over the faces thereof, threaded members connected with the lower extremities of the ribbons, a bolt having oppositely-disposed threads upon which said members are mounted, an equalizer bar in which said bolt is mounted, and means for connecting the equalizer bar with the commodity receptacle.

13. In a weighing scale, a pair of oppositely-disposed pendulums, segments connected to said pendulums and extending toward each other, flexible ribbons fixed at their upper extremities to the segments and passing over the faces thereof, members connected with the lower extremities of the ribbons, means for moving said members toward or away from each other to change the lowest points of contact of the ribbons with the segments and for connecting said members to the commodity receptacle.

14. In pendulum weighing mechanism, a pendulum center comprising fulcrum segments and a power segment of different diameters, a flexible member secured to and passing over the face of the power segment, and means for moving the flexible member toward or away from the power segment to vary the initial lowest point of contact of the flexible member with the power segment.

HALVOR O. HEM.

Witnesses:
C. F. MILLER, Jr.,
R. HECKLER.